(12) United States Patent
Hanaya et al.

(10) Patent No.: US 7,806,810 B2
(45) Date of Patent: Oct. 5, 2010

(54) BICYCLE SIMULATION SYSTEM

(75) Inventors: Ryukou Hanaya, Saitama (JP); Atsushi Yonehana, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1086 days.

(21) Appl. No.: 11/441,072

(22) Filed: May 26, 2006

(65) Prior Publication Data

US 2006/0270527 A1    Nov. 30, 2006

(30) Foreign Application Priority Data

May 30, 2005  (JP) .............................. 2005-157233
May 30, 2005  (JP) .............................. 2005-157427

(51) Int. Cl.
    *A63B 69/16* (2006.01)
(52) U.S. Cl. .......................................... 482/61; 482/63
(58) Field of Classification Search ...................... 482/4,
    482/5, 6, 7, 8, 51, 57, 58, 59, 60, 61, 62,
    482/63, 64, 65; 601/36
    See application file for complete search history.

(56) References Cited

U.S. PATENT DOCUMENTS

| 3,096,852 | A |   | 7/1963  | Harwood |
| 4,266,794 | A | * | 5/1981  | Bals .............................. 280/227 |
| 4,436,097 | A | * | 3/1984  | Cunningham ................ 600/520 |
| 4,512,567 | A |   | 4/1985  | Phillips |
|   396,201 | A |   | 1/1989  | Forest et al. |
| 4,932,650 | A |   | 6/1990  | Bingham et al. |
| 5,397,285 | A |   | 3/1995  | Haan et al. |
| 5,431,614 | A | * | 7/1995  | Jeranson ........................ 482/57 |
| 5,674,158 | A | * | 10/1997 | Navas ........................... 482/58 |
| 6,159,132 | A | * | 12/2000 | Chang ........................... 482/57 |
| 6,852,070 | B1| * | 2/2005  | Herbert ......................... 482/57 |
| 2004/0072657 | A1 | * | 4/2004 | Arguilez ....................... 482/61 |
| 2005/0233866 | A1 | * | 10/2005 | Miyamaru et al. ............. 482/57 |
| 2006/0079382 | A1 | * | 4/2006 | Lassanske et al. ............. 482/63 |

FOREIGN PATENT DOCUMENTS

| CN | 2565476Y Y | 8/2003 |
| JP | 1175870 A | 7/1989 |
| JP | 6-7873 B2 | 2/1994 |
| JP | 11-174944 A | 7/1999 |
| SU | 1 724 285 A1 | 4/1992 |

* cited by examiner

*Primary Examiner*—Loan Thanh
*Assistant Examiner*—Tam Nguyen
(74) *Attorney, Agent, or Firm*—Birch, Stewart, Kolasch & Birch, LLP

(57) ABSTRACT

A bicycle simulation system that can be easily transported includes a frame, a steering handle operated by a rider, a left-right pair of pedals to be operated by the rider for rotating a flywheel, two front forks for supporting the head tube and a rotatable rear wheel. The rear wheel is grounded on a floor so that it supports the frame, together with the front forks. The bicycle simulation system ensures that the operations of a brake lever are accompanied with the same feeling as that in operating a real bicycle. A brake lever is operated by the rider with a drum brake for frictionally braking the rotation of the flywheel in conjunction with the brake lever. A brake wire extending from the brake lever and is branched into two brake wires, one connected to the drum brake, and the other connected to the rotational sensor.

17 Claims, 12 Drawing Sheets

BICYCLE SIMULATION SYSTEM

CROSS-REFERENCE TO RELATED APPLICATIONS

The present application claims priority under 35 USC 119 to Japanese Patent Application Nos. 2005-157427 and 2005-157233 both filed on May 30, 2005 the entire contents of which are hereby incorporated by reference.

FILED OF THE INVENTION

The present invention relates to a bicycle simulation system for traffic safety education, games and physical training.

DESCRIPTION OF BACKGROUND ART

For a simulated experience with respect to driving airplanes, automobiles, motorcycles, bicycles and the like, simulation systems corresponding to the respective vehicles have been proposed. Some of these devises have been put to practical use. In a bicycle simulation system, the rider (operator) operates pedals while being seated astride a saddle of a dummy bicycle to thereby perform a simulated cycling, a simulated velocity and the like are obtained by detecting the rotation of the pedals by a predetermined speed sensor, and a simulation process is executed.

The dummy bicycle used in the bicycle simulation system may be provided with a flywheel for giving an appropriate load to the rotation of the pedals. See, for example, Japanese Patent Publication No. Hei 6-7873.

The form of utilization of a bicycle simulation system is not limited to a stationary type utilization. For example, where a bicycle simulation system is used in a traffic safety classroom held for children at various places, the bicycle simulation system is transported by a transporting vehicle or the like each time the classroom is held or finished. The system must be manually conveyed from the use site to the transporting vehicle. Taking such a use into consideration, the dummy bicycle described in Japanese Patent Publication No. Hei 6-7873 is wholly lifted up and conveyed, which requires labor because the flywheel provided in the dummy bicycle is particularly heavy.

In addition, in the bicycle simulation system, the realism is high if the pedals, a brake lever and a steering handle can be operated in the same manner as in riding a real bicycle. More particularly, the realism is further favorably enhanced if the simulated vehicle velocity can be lowered by operating the brake lever. Further, it is preferable that the same load as in a real bicycle is exerted on the pedals according to the velocity and the acceleration. It is preferable that the feeling of operating the brake lever is as close to that in a real bicycle as possible.

From such a viewpoint, a simulator has been proposed in which a restriction portion formed of an elastic material such as rubber is provided at an end portion of the brake lever. The restriction portion is deformed under an operation of the brake lever so as to make the operating feeling close to that during real cycling. See, for example, Japanese Patent Laid-open No. Hei 11-174944.

In the simulator described in Japanese Patent Laid-open No. Hei 11-174944, the load exerted on the pedals is regulated simply according to a picture on a display, so that the interrelations between the rotation of the pedals, a simulated velocity or acceleration obtained by the rotation, the load exerted on the pedals, and the brake lever operations are not sufficiently taken into account. Thus, the following inconveniences are presumably generated. A time lag may be generated after a brake lever operation and before the start of deceleration, or an appropriate degree of deceleration according to the brake lever operation amount may not be obtained. Furthermore, it is difficult to accurately reproduce the situation in which a high load is exerted in the beginning stage upon the starting and a low load is exerted during constant-velocity running after acceleration.

In addition, in the brake mechanism in the simulator described in Japanese Patent Laid-open No. Hei 11-174944, a stationary elastic material is simply compressed, so that faint vibration of a rotary body transmitted to the brake lever cannot be reproduced. Thus, subtle velocity control through a small brake lever operation is difficult to achieve.

SUMMARY AND OBJECTS OF THE INVENTION

The present invention has been made in consideration of the problems of prior systems. Accordingly, it is an object of an embodiment of the present invention to provide a bicycle simulation system that can be easily conveyed or transported.

According to an embodiment of the present invention, there is provided a bicycle simulation system including a dummy bicycle, wherein the dummy bicycle includes a frame, a left-right pair of pedals to be operated by a rider, a rotary body rotated in conjunction with the operation of the pedals, a stand for supporting a part of the frame relative to a ground surface, and a wheel that is not in conjunction with the rotary body and the pedals and is rotatable relative to the frame. The wheel is in contact with the ground surface and supports the frame together with the stand. With the wheel not being in conjunction with the rotary body and the pedals and being in contact with the ground surface, the wheel together with the stand supports the frame and keeps the dummy bicycle upright during the simulated cycling. In addition, at the time of conveying the dummy bicycle, the stand is pulled up and the wheel is turned. Thus, the dummy bicycle can be easily conveyed with a light force even in the case where the rotary body is heavy.

In this case, preferably, the stand supports the front side of the frame, and the wheel supports the rear side of the frame. This ensures that the wheel appears like a rear wheel of a real bicycle, thereby providing a natural appearance. This alleviates the sense of resistance that might otherwise attend on riding the dummy bicycle. In addition, with the wheel provided at a position corresponding to the rear wheel, it is unnecessary to steer the wheel like a front wheel, so that the wheel is not placed into frictional contact with the ground surface.

The position of the rotational axis of the rotary body in the front-rear direction may be located between the rotational axis of the pedals and the wheel, whereby the stand can be pulled up with a light force, based on the so-called principles of a lever, even in the case where the rotary body is heavy. Further, where the wheel is located at a position corresponding to the rear wheel of a real bicycle, the rotary body is located in a dead space between the rotational axis of the pedals and the rear wheel, so that the degree of freedom in layout of other component parts is not limited, and the flywheel does not obstruct the movements of the rider's feet at the time of pedaling operations in a simulated cycling.

The rotational axis of the rotary body may be provided on the upper side of the rotational axis of the wheel, whereby the amount of work in pulling up the stand can be reduced.

According to the bicycle simulation system of an embodiment of the present invention, the wheel is not used in conjunction with the rotary body and the pedals. The wheel is in contact with the ground surface. Thus, the wheel together with the stand supports the frame and keeps the dummy bicycle upright during simulated cycling. In addition, the stand is pulled up and the wheel is permitted to turn at the time of conveying the dummy bicycle. Thus, the dummy bicycle can be easily conveyed with a light force even in the case where the rotary body is heavy.

It is an object of an embodiment of the present invention to provide a bicycle simulation system such that brake lever operations can be carried out with the same feeling as those in the case of a real bicycle.

According to an embodiment of the present invention, there is provided a bicycle simulation system including a dummy bicycle and a controller, wherein the dummy bicycle includes a left-right pair of pedals to be operated by a rider, a rotary body rotated in conjunction with the working of the pedals, a brake lever to be operated by the rider, a brake for frictionally braking the rotation of the rotary body in conjunction with the brake lever, and a brake operation detection means for detecting the amount of operation on the brake lever. The controller performs a predetermined output based on the amount of operation supplied from the brake operation detection means.

Thus, by frictionally braking the rotary body based on the brake lever operation, the brake lever can be operated with the same feeling as that in the case of a real bicycle.

In this case, preferably, the brake lever is connected to brake wires branched in a bifurcate form, the brake wire on one side is connected to the brake, and the brake wire on the other side is connected to the brake operation detection means. This makes it possible to provide the brake and the brake detection means separately and independently. In addition, a brake similar to a brake mechanism in a real bicycle wherein a wire can be operated can be adopted, so that the operating feeling and the appearance of the brake lever are close to those in a real bicycle. Thus, the realism is enhanced.

In addition, when the controller outputs an alarm based on the operational amount supplied from the brake operation detection means during the situation in simulated cycling, the learning of the brake operations can be made more securely, which is particularly favorable for education and training.

Furthermore, a configuration may be adopted in which the brake lever includes a first brake lever and a second brake lever, the first brake lever and the second brake lever are connected, respectively, with one end of the brake wires. The other end of the brake wires is connected to the brake. This configuration makes it possible to operate one brake by the first brake lever and the second brake lever in a combined manner; for example, braking can be made by operating either a right brake lever or a left brake lever.

According to the bicycle simulation system of an embodiment of the present invention, the rotary body is frictionally braked based on the brake lever operation, whereby the brake lever can be operated with the same feeling as that in the case of a real bicycle. In addition, the operation by the rider can be judged based on the operational amount supplied from the brake operation detection means. Thus, based on this judgment, a predetermined output is served to an alarm, a guidance or the like, whereby a variety of simulations can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8($b$) is a schematic diagram showing the height by which the flywheel is moved in the case where the flywheel is arranged on the lower side relative to the axle of the rear wheel;

DETAILED DESCRIPTION OF THE PREFERRED EMBODIMENTS

Now, the bicycle simulation system according to the present invention will be described through an embodiment thereof below, referring to the accompanying FIGS. 1 to 8B. The bicycle simulation system 10 according to this embodiment is used, for example, in a traffic safety classroom held for children at various places. The bicycle simulation system 10 is transported by a transporting vehicle or the like each time the classroom is held or finished.

Figure 1:
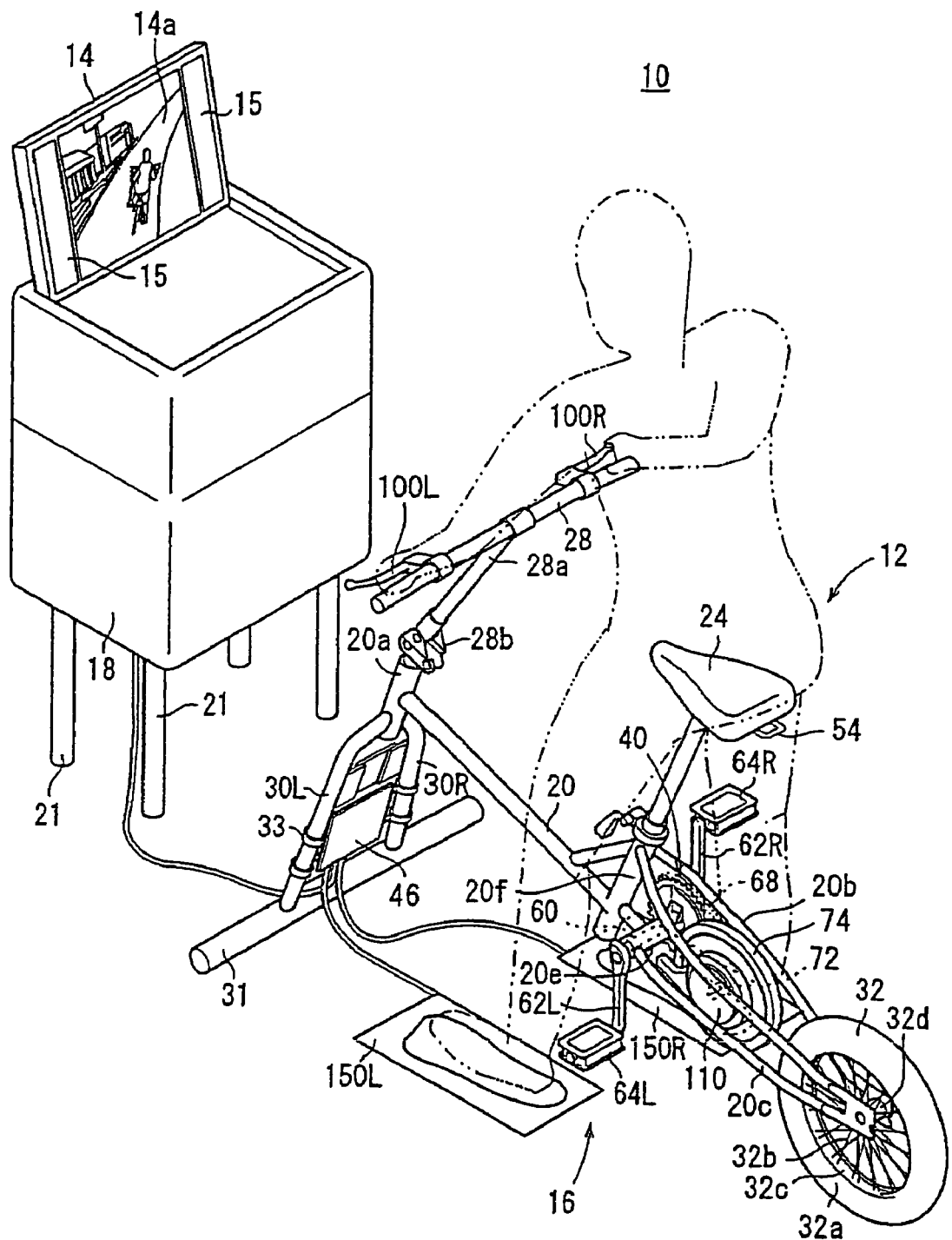
FIG. 1 is a perspective view of a bicycle simulation system according to the present embodiment.

As shown in FIG. 1, the bicycle simulation system 10 has a dummy bicycle 12, a monitor 14 for displaying scenery according to the operation of the dummy bicycle 12 on a screen 14$a$, a loudspeaker 15 for providing mimic sounds and vocal instructions to the rider, a mat switch 16 provided at a position where the rider rides on and get off the dummy bicycle 12, and a main control unit 18 for performing total control of the bicycle simulation system 10. The main control unit 18 is disposed on the front side of the dummy bicycle 12. The monitor 14 and the loudspeaker 15 are disposed at an upper portion of the main control unit 18 and at positions permitting easy visual checking by the rider on the dummy bicycle 12. The main control unit 18, the monitor 14 and the loudspeaker 15 are liftably supported by four struts 21 so that their height can be adjusted to the physical form of the rider.

In addition, the main control unit 18 has the function of displaying on the screen 14a a picture corresponding to the simulation, and also includes a function as a picture processing computer.

Next, the dummy bicycle 12 will be described. In the following description, as to a left-right pair of mechanisms in the dummy bicycle 12, "L" will be attached to the reference numeral for the left one, and "R" will be attached to the reference numeral for the right one.

The dummy bicycle 12 has a frame 20, a saddle 24 connected to the frame 20 through a seat pillar, a steering handle 28 turnable about a head tube 20a of the frame 20, two front forks 30R and 30L as a stand for fixingly supporting the head tube 20a, and a rear wheel (wheel) 32 rotatably supported by a seat stay 20b and a chain stay 20c of the frame 20. A pipe 31 extending in a horizontal direction is provided at the tip ends of the front forks 30R and 30L. The pipe 31 is grounded on a floor. A stem 28a of the steering handle 28 has a folding mechanism 28b in the vicinity of the head tube 20a that can be folded or disassembled.

Though the front forks 30R, 30L are similar in shape to a front fork of a bicycle (or motorcycle) on an appearance basis, they differ from a real front fork in that they are not turned in conjunction with the steering handle 28 and they are not provided with a front wheel.

The rear wheel 32 has a rotatable hub 32d, a plurality of spokes 32b provided substantially radially relative to the hub 32d, a rim 32c supported by the spokes 32b, and a tire 32a mounted to the rim 32c. The hub 32d, the spokes 32b, the rim 32c, and the tire 32a are similar to those generally used in real bicycles. The rear wheel 32 is of a small diameter type that can be rotated relative to the frame 20 under the action of the hub 32d.

Though the rear wheel 32 is the same as the rear wheel in a real bicycle on an appearance basis, it is an independent structure not operated in conjunction with a crankshaft 60 and a flywheel (rotary body) 74, and it is not rotated during simulated cycling. More specifically, the rear wheel 32 is grounded on a floor so that it functions also as a rear stand, and, together with the front forks 30R and 30L, it supports the frame 20 and keeps the dummy bicycle 12 upright. A controller is fixed between the front forks 30R, 30L and the pipe 31, through a bracket 33.

In addition, the dummy bicycle 12 has a rotation drive mechanism unit 40, a speed detection mechanism unit 42, a brake mechanism unit 44, the controller 46, a steering angle sensor 50 (see FIG. 4) for detecting the steering angle of the steering handle 28, a microphone 52 for inputting the voice of the rider, and a recession switch 54 provided at a rear portion of the saddle 24. The recession switch 54 is a switch to be operated when the rider gets off the dummy bicycle 12 and performs a predetermined simulated receding motion.

The rotation drive mechanism unit 40 has a pair of cranks 62L and 62R connected to left and right portions of the crankshaft (a rotary shaft of the pedals) 60 provided inside a crank tube 20e, pedals 64L and 64R provided at the tip ends of the cranks 62L and 62R, a front sprocket 66 provided on the crank 62R, a rear sprocket 70 rotationally driven by the front sprocket 66 through a chain 68, and an iron-made flywheel 74 rotationally driven by the rear sprocket 70 through a one-way clutch (also called a free hub) 72. The position of the one-way clutch 72 in the front-rear direction is located between the crankshaft 60 and the hub 32d, whereby the flywheel 74 is located on the rear side relative to the center of the dummy bicycle 12. More specifically, between a seat tube 20f and the rear wheel 32. The one-way clutch 72 is provided on the upper side relative to the hub 32d of the rear wheel 32.

Though the flywheel 74 acts as a load during simulated cycling and is therefore a heavy body, it is high in stability because it is provided between the front and rear stands (namely, the front forks 30R, 30L and the rear wheel 32). In addition, the position where the flywheel 74 is laid out is in a dead space not otherwise utilized, so that the degree of freedom in laying out other component parts is not limited. In addition, the flywheel does not obstruct the movements of the rider's feet at the time of a pedaling operation during simulated cycling.

The one-way clutch 72, by a ratchet mechanism therein, transmits only a rotational drive force in the forward direction of the rear sprocket 70. Therefore, when the crankshaft 60 is rotated in the reverse direction or when the rotation of the crankshaft 60 is stopped during the forward rotation of the flywheel 74, the rotating condition (forward rotation or stoppage) of the flywheel 74 at that time is maintained, irrespectively of the crankshaft 60.

Figure 2:
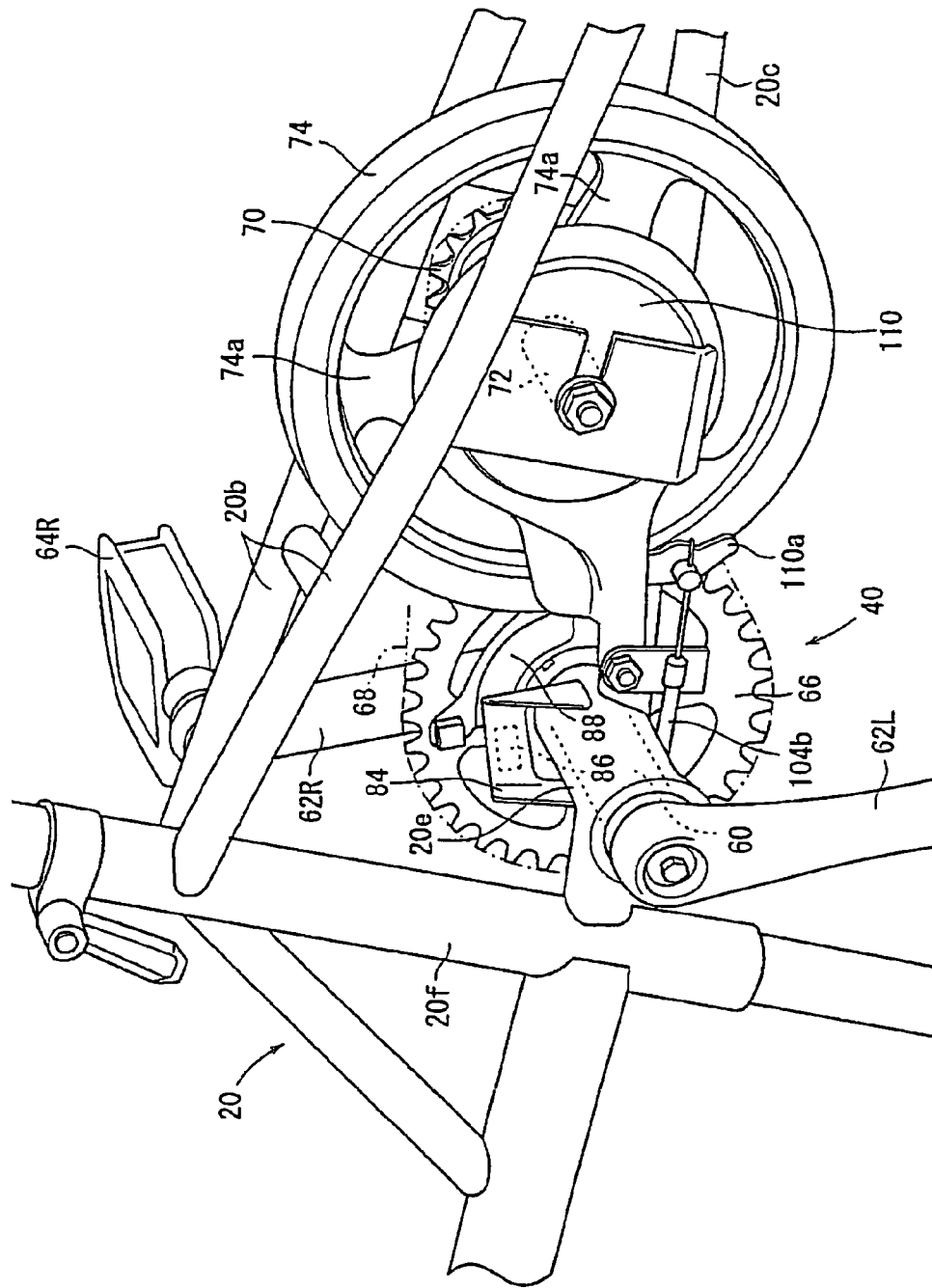
FIG. 2 is a perspective view of a rotation drive mechanism unit in a dummy bicycle and the vicinity thereof.
Figure 3:
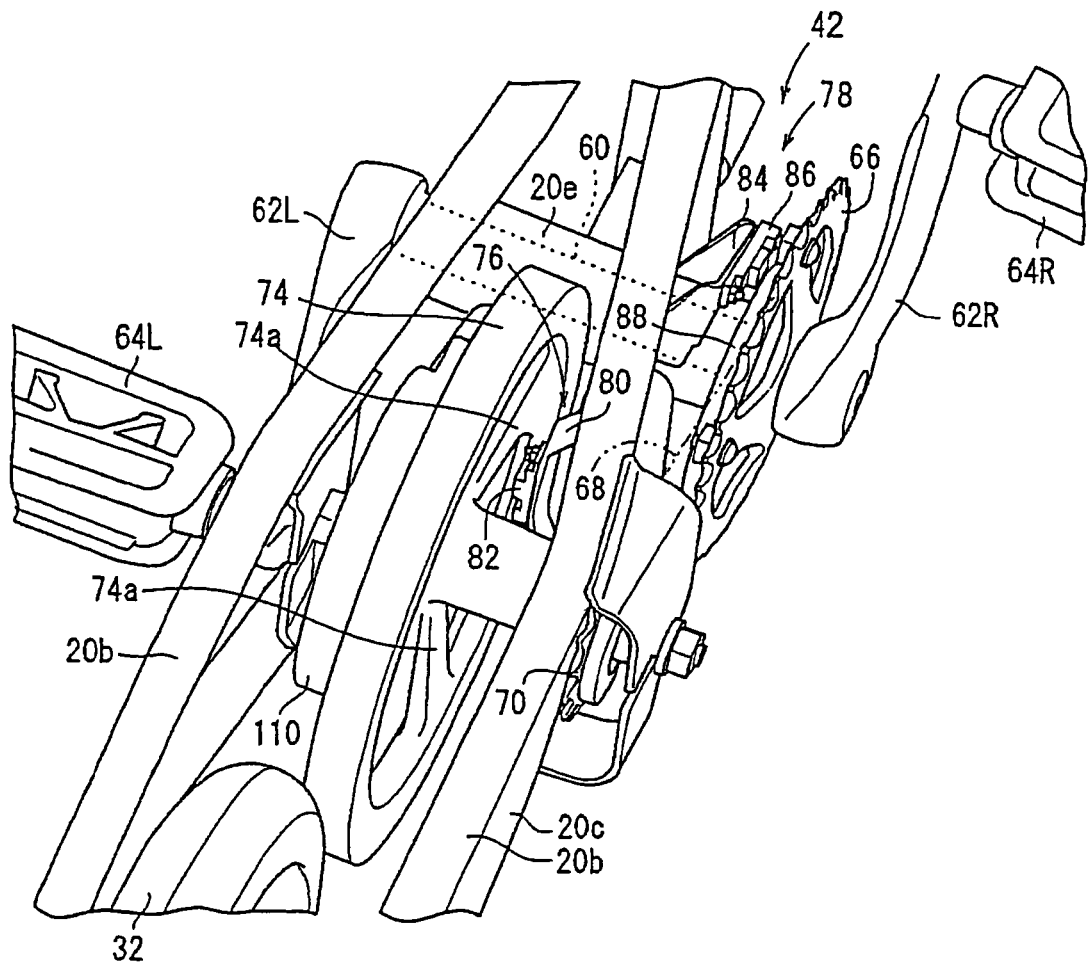
FIG. 3 is a perspective view, as viewed from the skew upper side, of a flywheel in the dummy bicycle and the vicinity thereof.

As shown in FIGS. 2 and 3, the speed detection mechanism unit 42 has a wheel rotation detecting portion 76 and a crank rotation detecting portion 78. The wheel rotation detecting portion 76 has a mount bracket 80 provided over the range from the seat stay 20b on the right side to a chain stay 20c, and a first speed pickup 82 provided on the mount bracket 80. The first speed pickup 82 is disposed at a position closely opposed to three spokes 74a of the flywheel 74. Thus, when the flywheel 74 is rotated, the first speed pickup 82 supplies the controller 46 with a signal indicating the presence or absence of the spoke 74a.

The crank rotation detecting portion 78 has a mount bracket 84 fixed to the crank tube 20e, a second speed pickup 86 provided on the mount bracket 84, and a detected rotor 88 fixed to the inside of the front sprocket 66. The detected rotor 88 is approximately a circular arc-shaped plate of about 90° that is disposed closely and opposed to the second speed pickup 86. When the pedals 64L and 64R are operated and the crankshaft 60 and the front sprocket 66 are thereby rotated, the second speed pickup 86 supplies the controller 46 with a signal indicating the presence or absence of the detected rotor 88. The second speed pickup 86 and the first speed pickup 82 are interchangeable.

Figure 4:
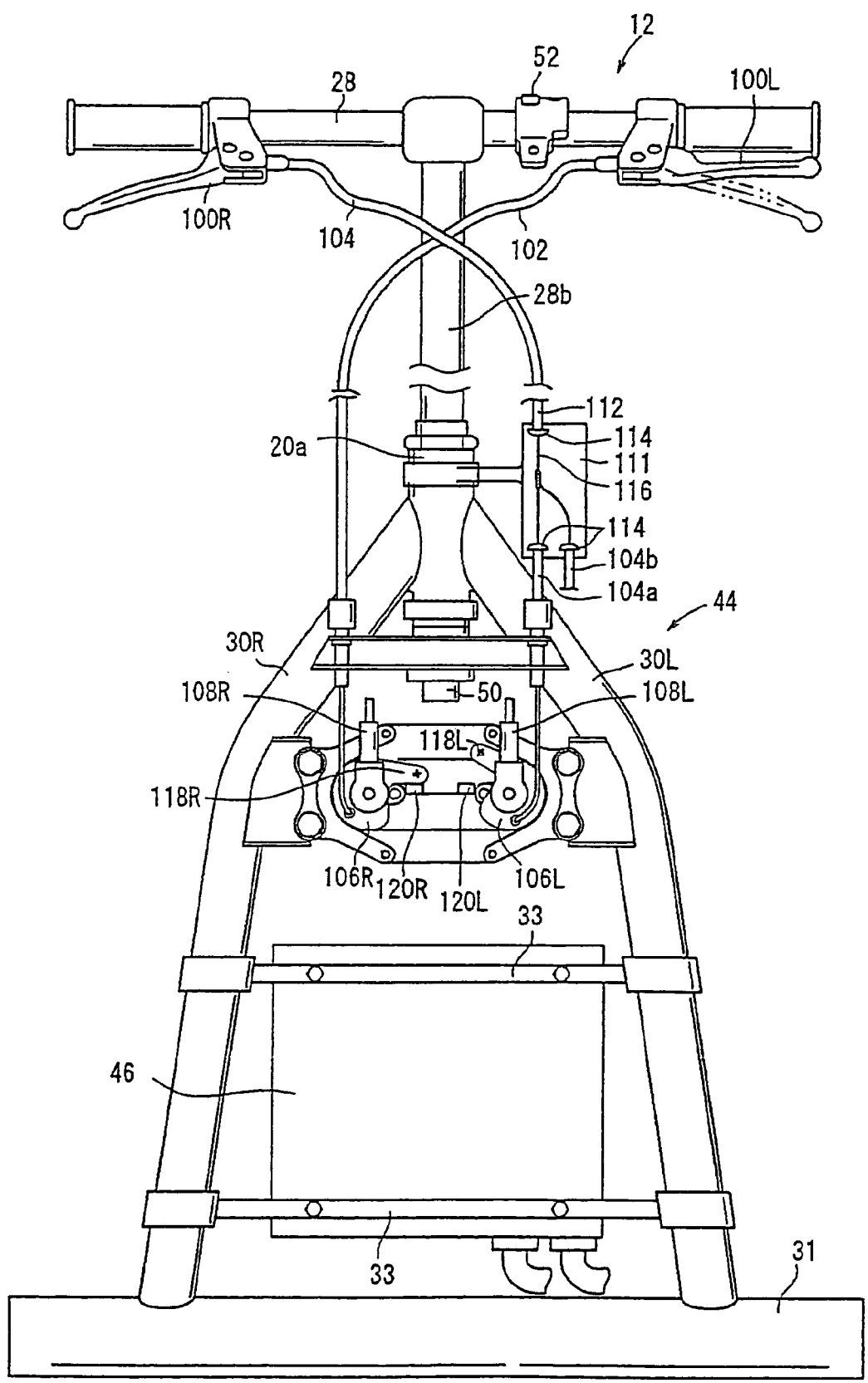
FIG. 4 is a front view of the dummy bicycle.

As shown in FIG. 4, the brake mechanism unit 44 has two brake levers 100L and 100R provided on the steering handle 28, brake wires 102 and 104 connected respectively to the brake levers 100L and 100R, elastically rotatable pulleys 106L and 106R, rotation sensors 108L and 108R, and a drum brake 110 (see FIG. 3) for braking the flywheel 74.

Figure 9:
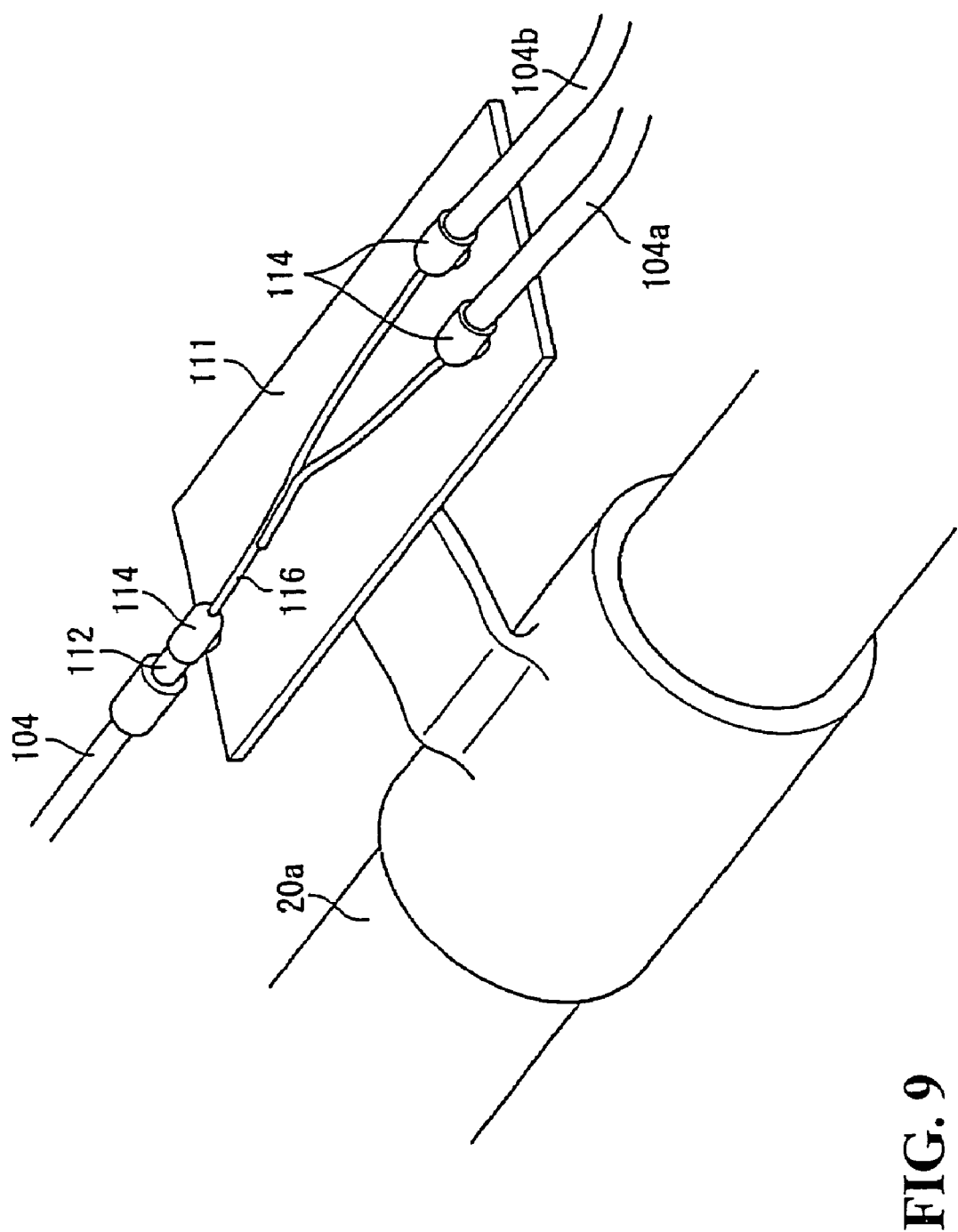
FIG. 9 is an enlarged perspective view of a branching mechanism.
Figure 10:
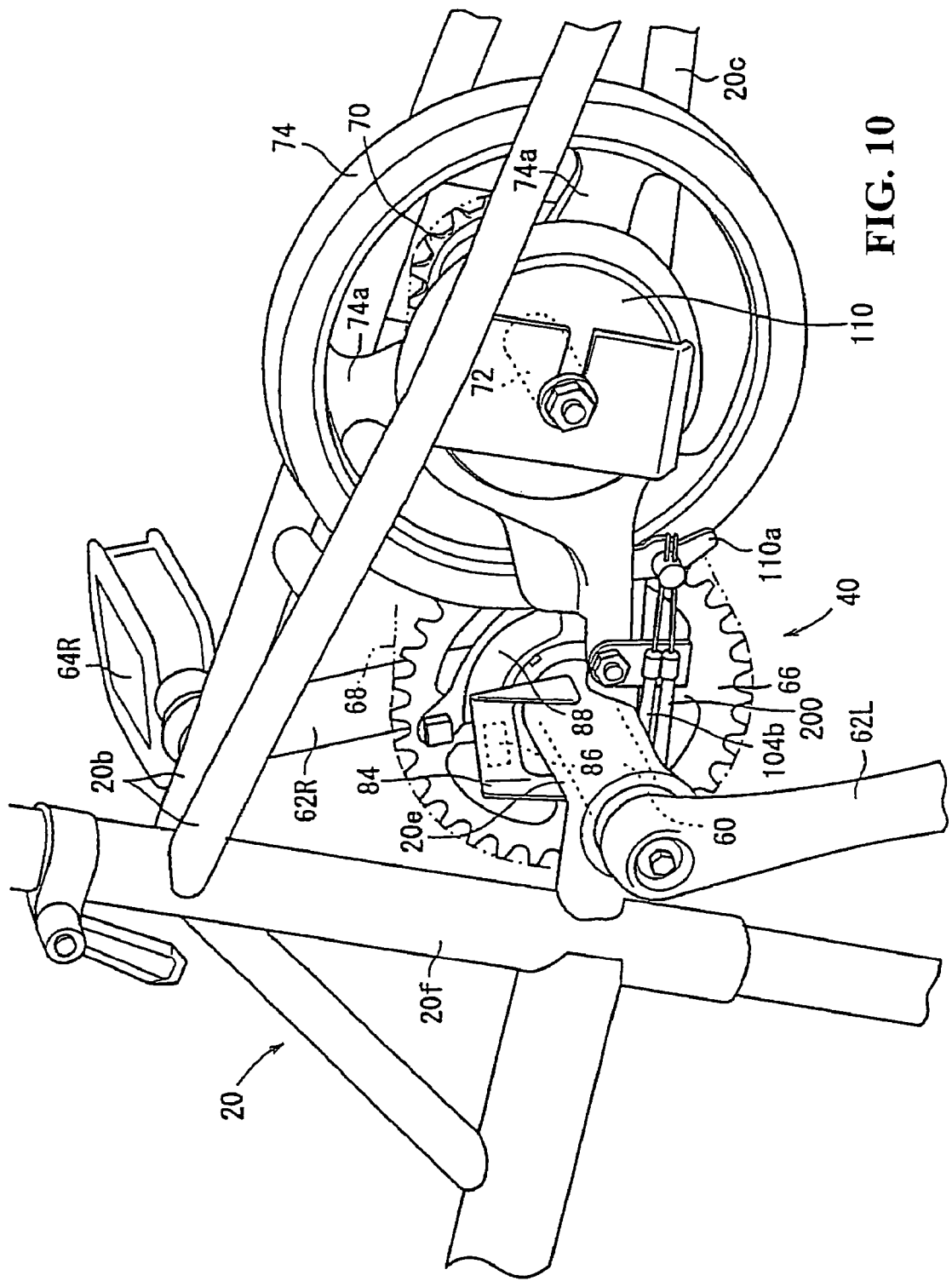
FIG. 10 shows a drum brake in which an arm is provided with two brake wires connected to left and right brake levers.

As illustrated in FIG. 9, the brake wire 104 is bifurcated by a branch mechanism 111 in its course, a brake wire 104a on one side extends toward the front forks 30R, 30L, and a brake wire 104b on the other side is connected to the drum brake 110. At the branching portion of the brake wire 104, a part of an outer wire 112 is peeled, an end portion thereof is supported by a ring 114, an exposed inner wire 116 is connected with two inner wires by press bonding, caulking, welding or the like, one of the two inner wires constitutes the brake wire 104a, and the other of the two inner wires constitutes the brake wire 104b. Therefore, with the brake lever 100R operated, the two brake wires 104a and 104b are pulled simultaneously.

The brake wire 104a and the brake wire 102 cross each other in their course, and lower end portions thereof are connected to the pulleys 106R, 106L. When none of the brake wires 100L and 100R is pulled, the pulleys 106L and 106R are elastically biased by springs (not shown) so that projecting portions 118L and 118R are directed upwardly. In this instance, the brake levers 100L and 100R are elastically biased by the pulleys 106L and 106R, to be separate from the steering handle 28.

With the brake levers 100L, 100R pulled toward the steering handle 28, the pulleys 106L, 106R are elastically rotated, whereby the projecting portions 118L and 118R are directed downwardly. The pulleys 106L, 106R can be rotated until the projecting portions 118L, 118R abut on stoppers 120L, 120R.

The rotation angles of the pulleys 106L, 106R can be detected by rotation sensors 108L, 108R, and signals of the angles detected are supplied to the controller 46. The controller 46 supplies the main control unit 18 with a signal according to the signals of the detected rotation angles of the pulleys 106L and 106R, in other words, the operational amounts of the brake levers 100L and 100R.

As shown in FIG. 3, the drum brake 110 is disposed concentrically with the flywheel 74, and an arm 110a thereof is connected to an end portion of the brake wire 104b. The drum brake 110 is provided therein with a drum body, which is connected to and rotated as one body with the flywheel 74. In addition, when the brake lever 100L is operated and the brake wire 104b is thereby pulled, the arm 110a is inclined, a brake shoe in the inside is opened wider in the direction of the outside diameter to make contact with the drum body, whereby a frictional force is generated, and the flywheel 74 is braked. The drum brake 110 may be other type of frictional brake (caliper brake, disk brake, or the like) operated in conjunction with the brake lever 100R. The frictional brake here means any mechanically acting brake, exclusive of electromagnetically acting brake. The means of operational transmission from the brake lever 100R to the brake is not limited to the wire type but may be of a link type, a hydraulic type or the like.

In addition, as shown in FIG. 4, the steering angle sensor 50 is provided at a lower end portion of the head tube 20a, and detects the turning angle of the stem 28a supporting the steering handle 28. The microphone 52 is provided on the steering handle 28, and is close to the face of the rider, so that the rider's voice is clearly inputted. The steering angle sensor 50, the microphone 52 and the recession switch 54 are connected to the controller 46, and supply the controller 46 with a steering angle signal, a vocal signal and a switch operation signal, respectively.

Returning to FIG. 1, the mat switch 16 is composed of a left switch 150L and a right switch 150R, which are independent and are disposed at such positions that the rider can tread thereon with his feet while being astride the head tube 20a of the frame 20 when he gets off. Namely, the left foot treads on the left switch 150L, and the right foot treads on the right switch 150R. The left switch 150L and the right switch 150R are turned ON when trodden on, and supply ON signals to the controller 46.

The left switch 150L and the right switch 150R are each in a thin mat-like form, having a rubber backing, longitudinal electrode wires and transverse electrode wires arranged in a lattice form opposite to the rubber backing, and a soft insulating material inserted between the backing rubber and a face rubber. The longitudinal electrode wires and the transverse electrode wires are connected to two output terminals (not shown), respectively. When the rider treads on the rubber face with his foot, the rubber face is elastically deformed while compressing the insulating material, wherein the longitudinal electrode wires and the transverse electrode wires make contact with each other at their intersecting locations. As a result, the two output terminals are put into conduction, and the switch is turned ON. When the foot is released from the rubber face, the longitudinal electrode wires and the transverse electrode wires are separated from each other, and the switch is turned OFF. In addition, the mat switch 16 may not necessarily be of the left-right independent type, a mat switch 16a having two switches formed integrally may be adopted, and may be disposed on the left side of the dummy bicycle 12, for example. With the mat switch 16a arranged when the rider having dismounts from the dummy bicycle 12 to the left side and places his/her foot on the rubber face, a bicycle-pushing walking action in a walking mode which will be described later is more realized realistically.

Figure 5:
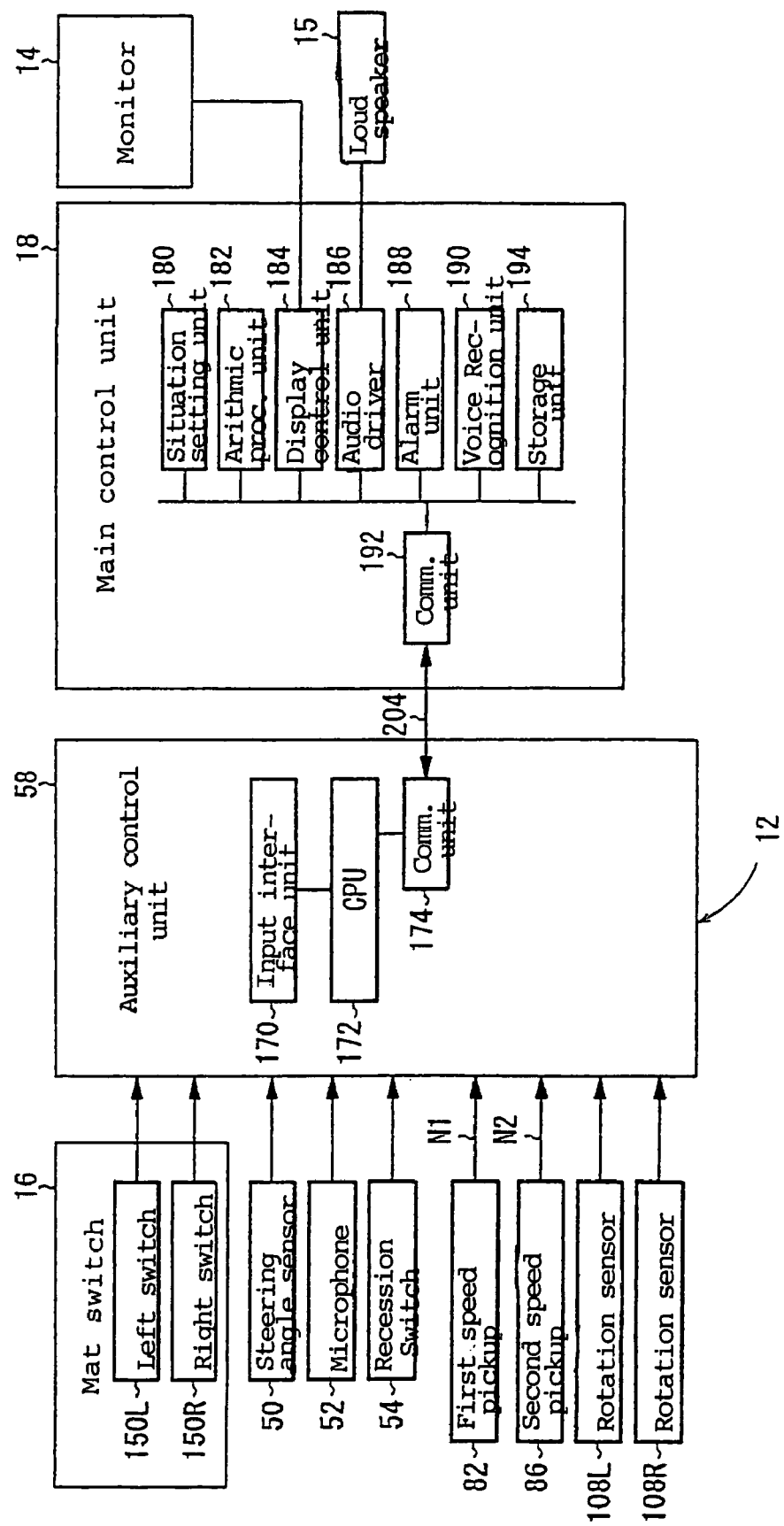
FIG. 5 is a block diagram of electrical component parts of the bicycle simulation system.

As shown in FIG. 5, the controller 46 has an input interface unit 170, a CPU (Central Processing Unit) 172, and a first communication unit 174. The first communication unit 174 is connected to a second communication unit 192 of the main control unit 18, so as to perform real-time communication with the main control unit 18. The input interface unit 170 is connected with the steering angle sensor 50, the microphone 52, the first speed pickup 82, the second speed pickup 86, the rotation sensors 108L, 108R, the recession switch 54, the left switch 150L, and the right switch 150R, for inputting analog signals and digital signals.

The CPU 172 processes or converts the signals from the above-mentioned electrical component parts and transmits the processed or converted signals to the main control unit 18 via the first communication unit 174. For example, the CPU 172 obtains the rotational speed N1 of the flywheel 74 and the rotational speed N2 of the crankshaft 60 from the frequencies of the signals supplied from the first speed pickup 82 and the second speed pickup 86, multiplies the rotation speed N1 by a predetermined constant to obtain a simulated operating velocity V, and supplies the simulated velocity V to the main control unit 18.

The main control unit 18 has a situation setting unit 180 for setting a simulated cycling situation, an arithmetic processing unit 182 for executing an arithmetic process according to the operating conditions, a display control unit 184 for controlling the display on the monitor 14, an audio driver 186 for an acoustic output of the loudspeaker 15, an alarm unit 188 for issuing predetermined alarms to the rider, a voice recognition unit 190 for recognizing the voice inputted from the microphone 52, the second communication unit 192 for controlling the communication with the first communication unit 174, and a rewritable storage unit 194.

In practice, the main control unit 18 has the CPU (Central Processing Unit) as a control main body and a RAM (Random Access Memory), a ROM (Read Only Memory), an HD (Hard Disk) and the like as storage units, and the functional units of the main control unit 18 shown in FIG. 5 are so realized that the CPU reads a program recorded on the HD, and executes the program while cooperating with the ROM, the RAM and predetermined hardware.

Now, a method of simulating the operating of a bicycle by use of the bicycle simulation system 10 configured as above will be described below.

Figure 6:
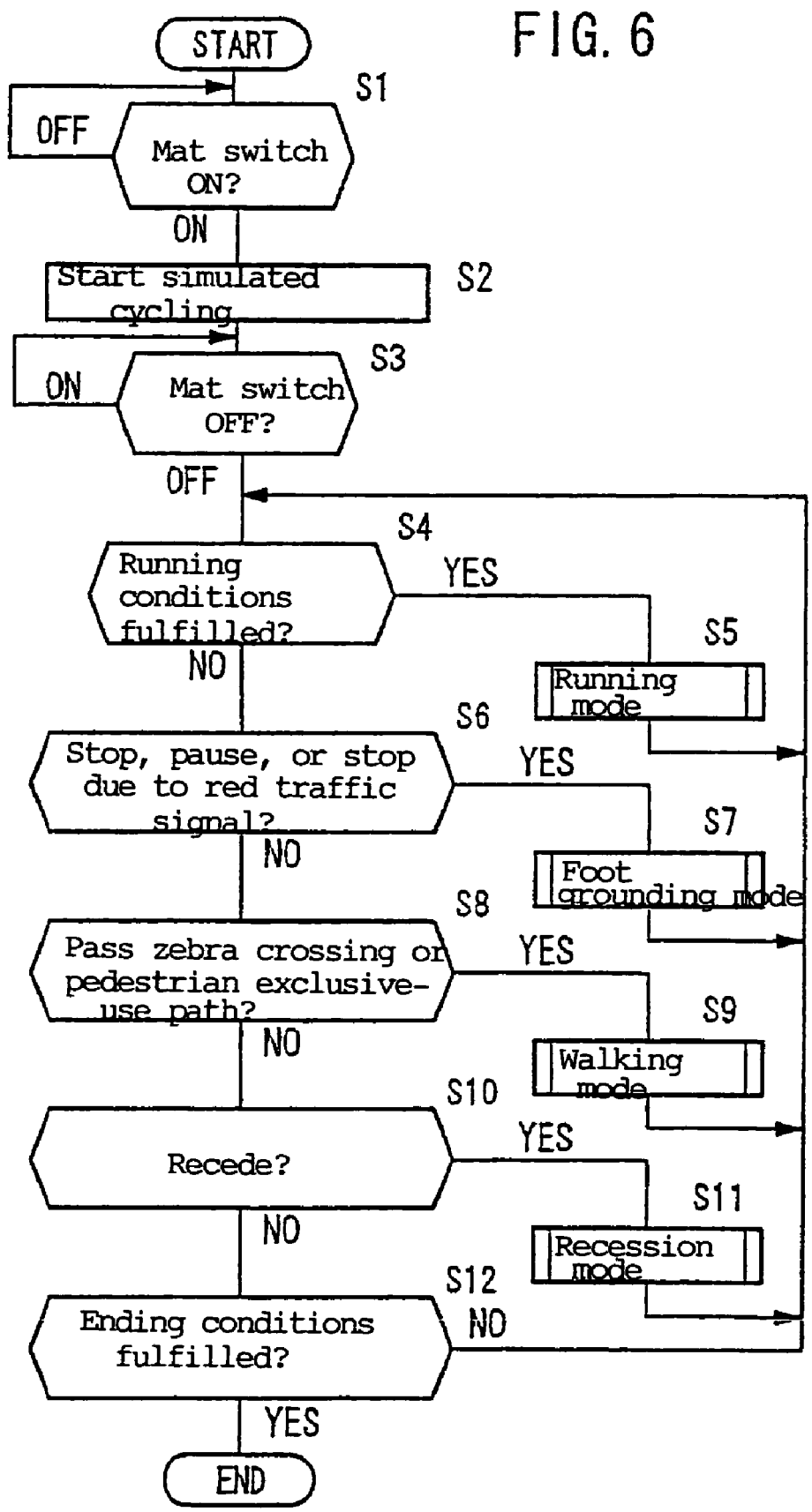
FIG. 6 is a flowchart of a main routine in a method of performing a simulated cycling by use of the bicycle simulation system.

In step S1 in FIG. 6, it is checked whether or not the mat switch 16 is turned ON. Specifically, when at least one of the left switch 150L and the right switch 150R of the mat switch 16 is turned ON, step S2 is entered, whereas when both of the switches are OFF, the control process stands by at step S1. In other words, when the rider stands on the mat switch 16, step S2 is automatically entered, and, until then, the control process stands by at step S1, and a predetermined power saving mode (for example, the monitor 14 is turned OFF) can be maintained.

In step S2, a simulated cycling is started, and a predetermined starting picture is displayed on the screen 14a. In the starting picture, an image of a bicycle at rest and an image of a person as the rider standing by the bicycle are displayed. In addition, the characters "A simulated cycling is going to be started. Please seat yourself on the saddle and operate the pedals." are displayed on the screen 14a, or an audio message with the same words is issued from the loudspeaker 15. Such an output is made also according to the rotational amounts detected by the rotational sensors 108L, 108R as will be described later.

Thus, the simulated cycling can be automatically started by treading on the mat switch 16, and the simulated cycling can be started without need for a complicated operation and without any sense of incompatibility. In addition, it suffices for the rider to carry out operations according to the instructions issued from the screen 14a or the loudspeaker 15, so that a manual or the like is not needed, the operations are easy to carry out, and even children can perform the simulated cycling.

In step S3, it is checked whether or not the mat switch 16 is turned OFF. More specifically, when the left switch 150L and the right switch 150R are both turned OFF, step S4 is entered, whereas when at least one of the switches is ON, the control process stands by at step S3.

To be more specific, when the rider is seated astride the saddle 24 and removes his feet from the mat switch 16, step S4 is automatically entered, and an actual operating in the simulated cycling can be started. In this instance, the starting picture is ended, and an image of the bicycle and an image of the person riding on the bicycle are displayed.

In step S4, it is checked whether or not predetermined operating conditions are fulfilled. When the operating conditions are fulfilled, an operating mode in step S5 is entered, whereas when the operating conditions are not fulfilled, step S6 is entered. The operating mode is a mode in which the rider seated on the saddle 24 works the pedals 64L and 64R and manipulates the steering handle 28 so as to perform a simulated operation. In this case, a scene varied according to a simulated operating velocity V and a steering angle obtained based on the first speed pickup 82 and the steering angle sensor 50 is displayed on the screen 14a (see FIG. 1). In the operating mode, it is recommendable to issue a predetermined alarm in a situation where the simulated operating velocity V is not less than a prescribed velocity, a situation where the virtual bicycle has stepped out of a virtual road, or the like situation.

More specifically, first, from the condition where the flywheel 74 is stopped, the flywheel 74 begins to be rotated by starting the working of the pedals 64L and 64R, the rotation is detected by the first speed pickup 82 attendant on this, and the simulated operating velocity V starts rising from 0. In this case, the load felt by the rider is high in the beginning according to the moment of inertia of the flywheel 74, and is low during operation at a constant velocity after acceleration, so that a feeling very close to the operating feeling of a real bicycle is obtained. In addition, the load felt by the rider is free of delay in response to the movements of the rider's feet, and is close to that in riding a real bicycle.

In addition, in the operating mode, the flywheel 74 is braked and various processes of control are executed, according to the operations on the brake levers 100R and 100L. These actions relating to the brake levers 100R and 100L will be described later.

In step S6, it is checked whether or not the situation of the simulated cycling is a stop, a pause, or a red traffic signal. In the cases of a stop, pause or red traffic signal, a foot grounding mode in step S7 is entered; in other cases, step S8 is entered. In the foot grounding mode, the rider operates the brake levers 100L, 100R to bring the simulated operating velocity V to 0, thereafter dismounts from the dummy bicycle, and treads on the mat switch 16. As a result, a scene in which the rider and the bicycle are at rest in the presence of a red traffic signal is displayed on the screen 14a. The foot grounding mode is canceled when the traffic signal is changed from red to green, or when confirmation of safety on the left and the right is assuredly made, on the basis of the situation in the simulated cycling.

In step S8, it is checked whether or not the situation in the simulated cycling is the case of passing a pedestrian priority path such as a zebra crossing or a pedestrian exclusive-use path such as a footpath. In the case of passing a pedestrian priority path or a pedestrian exclusive-use path, a walking mode in step S9 is entered; in other cases, step S10 is entered. The walking mode is a mode for the rider to walk while pushing the bicycle along a pedestrian exclusive-use path or the like, for example, a mode for learning to walk while pushing the bicycle so as not to trouble other pedestrians or the like. In this case, the rider dismounts from the dummy bicycle 12 and stamps on the mat switch 16, whereby the walking conditions are reproduced, and a corresponding scene is displayed on the screen 14a of the monitor 14.

In step S10, it is checked whether or not the situation in the simulated cycling is a situation of moving the bicycle rearwardly. In the case of rearward movement (recession), a recession mode in step S11 is entered; in other cases, step S12 is entered. The recession mode is a mode in which the rider having dismounted from the bicycle recedes while pushing the bicycle. In this case, the rider dismounts from the dummy bicycle 12, and stamps on the mat switch 16 while turning ON the recession switch 54, whereby the receding conditions are reproduced, and a corresponding scene is displayed on the screen 14a of the monitor 14.

In step S12, it is checked whether or not predetermined end conditions are fulfilled. When the end conditions are fulfilled, the simulated cycling is ended, whereas when the conditions are not fulfilled, the control process returns to step S4, and the simulated cycling is continued. In addition, the control process returns to step S4 after the processing in each of steps S5, S7, S9 and S11 is finished.

In the case of ending the simulated cycling, it is checked whether or not the mat switch 16 is turned ON, like in step S1. In this case, based on the condition where the mat switch 16 is turned ON, it can be detected that the rider has dismounted from the dummy bicycle 12, based on this, the simulated cycling is ended, and the system returns into a stand-by state such as a predetermined power saving mode. In addition, in the case where no operation of the dummy bicycle 12 is done in a predetermined period after the mat switch 16 is turned OFF in step S2, it is considered that the rider has once trodden on the mat switch 16 but has walked away without riding on the dummy bicycle 12, in this case, also, it is recommendable for the system to return into the stand-by state.

Figure 7:
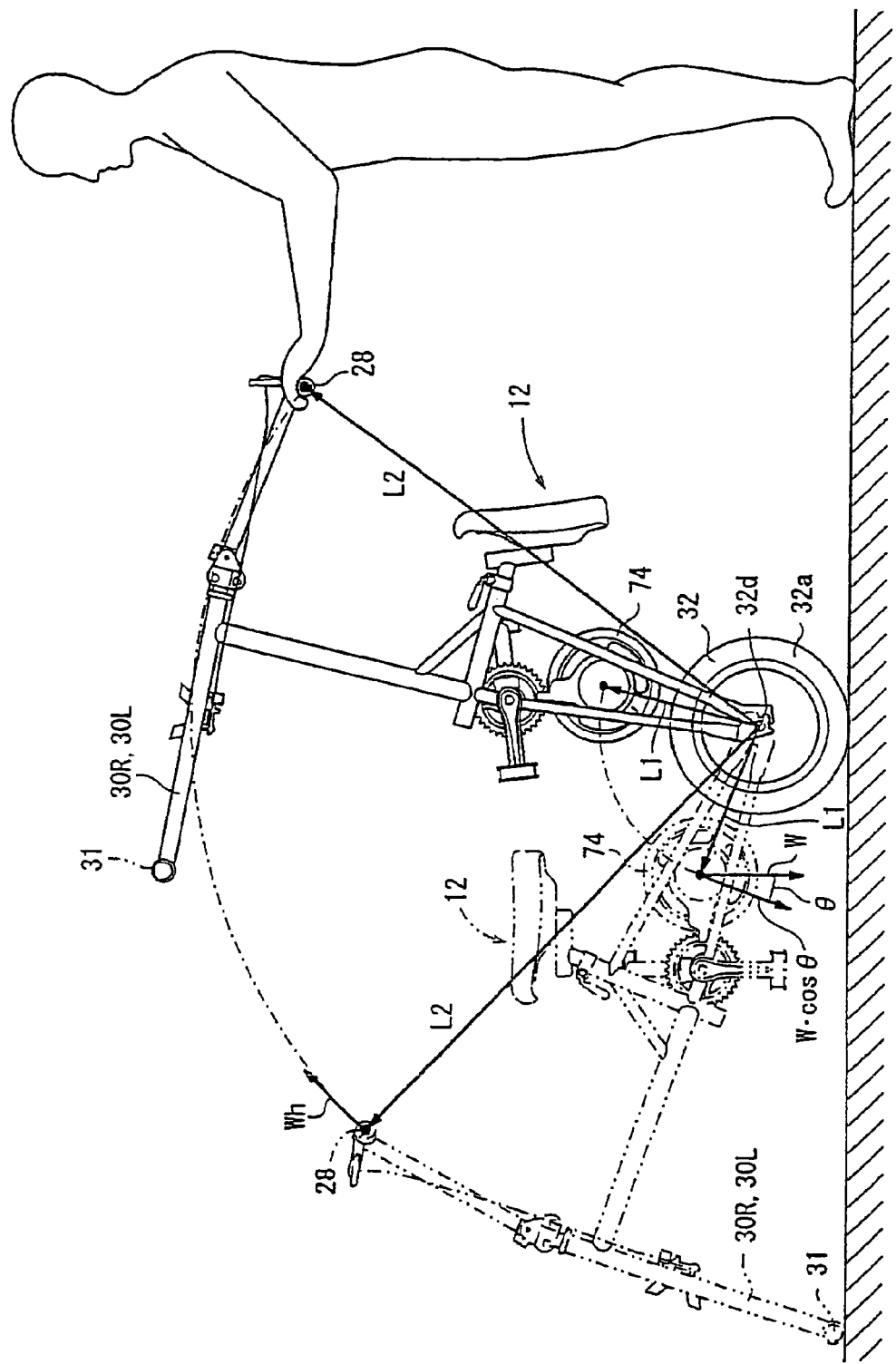
FIG. 7 is a side view of the dummy bicycle in the condition where a steering handle is lifted up.

In the next place, in the case of conveying the bicycle simulation system 10 as above from a use site to a transporting vehicle, predetermined connection wires are first disconnected at a connector portion or the like. Thereafter, as shown in FIG. 7, the steering handle 28 is pulled up to separate the pipe 31 from the ground surface, whereby a condition where only the tire 32a is in contact with the ground surface is obtained. In this case, since the position of the flywheel 74 in the front-rear direction is located on the rear side relative to the center of the dummy bicycle, the distance L1 from the hub 32d to the rear wheel 32 serving as a rotational support shaft is short, and the distance L2 from the steering handle 28 serving as a point of application of force to the hub 32d is sufficiently longer than the distance L1. Therefore, let the weight of the flywheel 74 be W, then the force Wh exerted on the steering handle 28 due to the flywheel 74 is Wh=L1/L2·W·cos θ, which is lighter than the weight W, based on the so-called principles of a lever. In the formula, θ is the angle formed between the tangential direction of rotation and the vertical line.

Since the flywheel 74 is a particularly heavy body among the component elements of the dummy bicycle 12, the center of gravity and the weight of the flywheel 74 are roughly the same as the center of gravity and the weight of the dummy bicycle 12, and the flywheel 74 balances with the force Wh, whereby the steering handle 28 can be lifted up by a light force which is nearly equal to the force Wh.

Figure 8A:
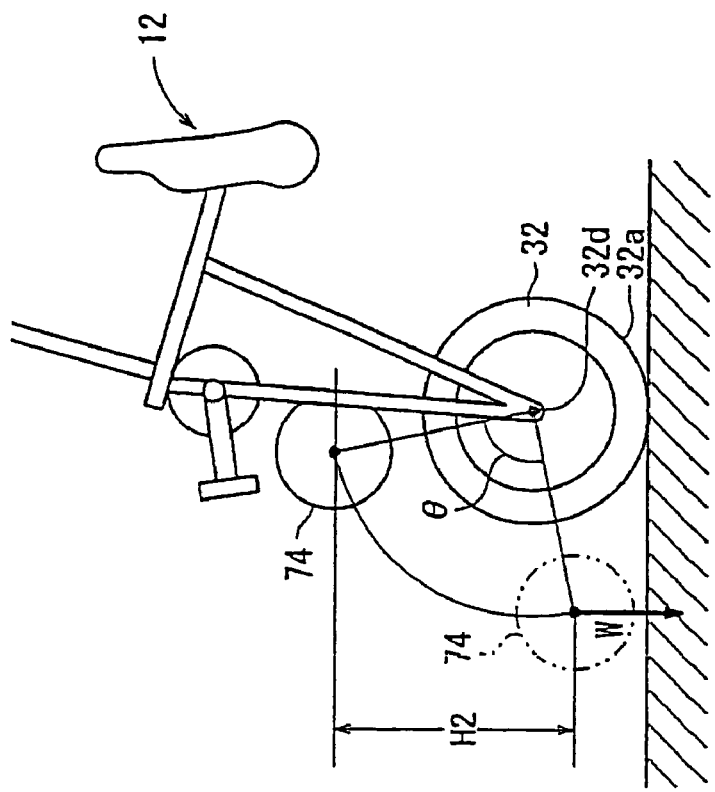
FIG. 8($a$) is a schematic diagram showing the height by which the flywheel is moved in the case where the flywheel is arranged on the upper side relative to the axle of a rear wheel.
Figure 8B:
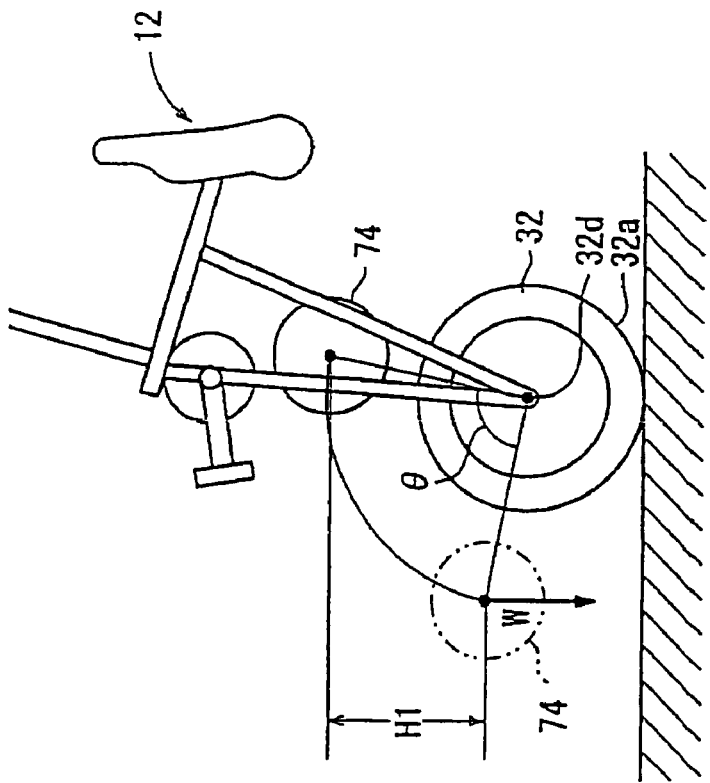

In addition, as shown in FIG. 8A, at the time of a stationary state (the two-doted chain line portion in FIG. 8A), the one-way clutch 72 corresponding to the position of the center of gravity of the flywheel 74 is located on the upper side relative to the hub 32d of the rear wheel 32, so that the movement of a circular arc locus of the flywheel 74 at the time of pulling up the steering handle 28 is a locus extending from a skew front side position to the upper side, as viewed from the hub 32d of the rear wheel 32. Therefore, the locus is roughly horizontal at its upper portion. Thus, the height H1 by which the flywheel 74 is lifted up is small. On the other hand, as shown in FIG. 8B, if the one-way clutch 72 at the time of a stationary state (the two-dotted chain line portion in FIG. 8B) is located on the lower side relative to the hub 32d, the movement circular arc locus is at a skew position as viewed from the hub 32d, and the locus does not have a roughly horizontal portion. Therefore, the height H2 by which the flywheel 74 is lifted up is large.

Thus, in the case where the one-way clutch 72 is located on the upper side relative to the hub 32d, the height H1 by which the flywheel 74 is lifted up is smaller than that H2 in the case where the one-way clutch 72 is located on the lower side, and the amount of work due to the increase in potential energy at the time of lifting up the steering handle 28 is accordingly smaller.

Next, the worker having lifted up the steering handle 28 conveys the dummy bicycle 12 to a predetermined transporting means such as a transporting vehicle by rolling the rear wheel 32 while gripping the steering handle 28 or the frame 20 or the like. In this case, since the rear wheel 32 rotates smoothly under the action of the hub 32d, the dummy bicycle 12 can be conveyed with a light force even where the flywheel 74 is heavy, and can be conveyed by a single worker. In addition, the action of the tire 32a promises a lower rolling friction as well as an appropriate vibration absorption performance and an excellent portability.

After the dummy bicycle 12 is conveyed to and mounted on the transporting means, the worker put down the steering handle 28 so that the pipe 31 is grounded on the load-carrying platform of the transporting means. Further, thereafter, it is recommendable to fold down the stem 28a by use of the folding mechanism 28b, if necessary. The dummy bicycle 12 can naturally be conveyed easily at the time of unloading the dummy bicycle 12 from the transporting means, like at the time of conveying and loading the dummy bicycle 12 onto the transporting means.

As has been described above, the dummy bicycle 12 in the bicycle simulation system 10 according to the present embodiment can be easily conveyed with a light force by rolling the freely rotatable rear wheel 32, notwithstanding that the dummy bicycle 12 is provided with the heavy flywheel 74 used for exerting a load. In addition, since the center of gravity of the flywheel 74 is located on the upper side relative to the hub 32d of the rear wheel 32, a small amount of work suffices at the time of lifting up the steering wheel 28.

Therefore, the bicycle simulation system 10 can be favorable applied to such uses as the use in traffic safety classrooms held for children at various places wherein the bicycle simulation system 10 is frequently transported.

The rear wheel 32 is independently configured so as not to be in conjunction with the flywheel 74, the pedals 64R, 64L and the like, so that the rear wheel 32 is not rotated or steered and can be kept in contact with a ground surface, during simulated cycling. This permits the rear wheel 32 to function also as a rear stand for supporting the frame 20, together with the front forks 30R and 30L.

In addition, while the bicycle simulation system 10 is not provided with a front wheel, if a front wheel is provided, the front wheel would be put into frictional contact with the ground surface because it is steered by the steering handle 28. If such a front wheel is fixed, the frictional contact with the ground surface can be prevented, but the front wheel is not moved in conjunction with the operation on the steering wheel 28, which is unnatural. On the other hand, the rear wheel 32 is not in used conjunction with the steering handle 28. Thus, the rear wheel 32 is not put into frictional contact with the ground surface, can be provided with a natural appearance, and is favorable as a rear stand.

The hub 32d, the tire 32a and the like constituting the rear wheel 32 are general-use members, so that they are inexpensive and are similar in appearance to those in a real bicycle, which enhances realism. In addition, training can also be conducted as to air pressure checks for the tire 32a, feeding air into the tire 32a, tire replacement, puncture repair and the like.

Now, actions of the brake operations in the operating mode will be described below. First, when the brake lever 100R is operated by the rider, the brake wire 104b pulls an arm 110a (see FIG. 2) of the drum brake 110, whereby a frictional force is generated between a drum body and a brake shoe in the inside, and the flywheel 74 is braked, resulting in deceleration. In addition, the rotation of the flywheel 74 is detected by the first speed pickup 82, the rotation is converted into the simulated operating velocity V in the controller 46, and the simulated running velocity V is supplied to the main control unit 18. In the main control unit 18, the varying speed of the scene displayed on the screen 14a is reduced according to the simulated running velocity V.

In this case, the drum brake 110 is the same brake mechanism as that of a wheel in a real bicycle, and the time delay from the speed detection process by the first speed pickup 82 to the supply of the simulated operating velocity V to the main control unit 18 is extremely short, so that an extremely natural deceleration scene without response delay, like that in real cycling, is displayed on the screen 14a.

In addition, the drum brake 110 brakes the flywheel 74 by mechanical action through the sliding friction. Therefore, slight vibration is transmitted to the brake lever 100L and an actual brake sliding sound is generated, like in the case of a real bicycle, so that the rider can get a more realistic feeling.

Further, in the controller 46 and the main control unit 18, the amount of operation of the brake levers 100L, 100R by the rider can be detected based on the signals from the rotation sensors 108L and 108R, and the following process can be performed.

When the situation of the simulated cycling is an approach to a crossing with a red traffic signal and the brake operation is not made, an alarm of "Please apply the brake for stopping." is outputted. Further, when the operation amount is too small or too large, alarms of "Braking is too slow." or "Braking is too rapid." are outputted, respectively.

Furthermore, the rotational sensors 108R and 108L correspond to the brake operational amount for the front wheel and the rear wheel in a real bicycle, and can individually judge the brake operation amounts for the front wheel and the rear wheel. Therefore, for example, by comparing the situation of the simulated cycling and the individual signals detected, it is recommendable to output an alarm of "Don't apply the brake only to the front wheel at a descending slope, please." or "The brake operation for the rear wheel is too strong relative to that for the front wheel." Where the simulated operating velocity V is not less than a prescribed velocity and the brake operation is absent, it is recommendable to output an alarm of "The velocity is too high, so please apply the brake." By thus outputting an alarm based on the brake operation amounts and the situation of simulated cycling, learning the brake operations can be achieved more securely, which is particularly preferable for education and training.

In addition, as for the judgment of whether the brake lever operation is present or not, it is possible to determine the deceleration by differentiating the simulated running velocity V obtained from the first speed pickup 82, and to presume that the drum brake 110 is acting when the deceleration is greater than a predetermined value. In this case, however, only the operation on the brake lever 100R is detected and the detection is indirect, so that a time delay is generated in the detection. On the other hand, where the rotational sensors 108R and 108L are used, the operations on the brake levers 100L and 100R can be detected individually and directly, it is possible to cope with the situation more appropriately and in a diverse fashion. Besides, the operations on the brake levers 100L and 100R can be detected even when the flywheel 74 is stopped.

In addition, at the time of stopping a real bicycle, a foot-on-a-pedal posture peculiar to a bicycle may be taken, in which the brake is continuously applied so as to restrain the forward rotation of the pedals (i.e., forward movement), one foot is put on the pedal, and the other foot is placed on the ground. In the bicycle simulation system 10, the flywheel 74 is fixed by the brake levers 100L and 100R, whereby the forward rotation of the pedals 64R, 64L can be restrained. This ensures that a foot-on-a-pedal posture similar to that in the case of a real bicycle can be assumed. Thus, an operation close to that on a real bicycle is realized.

As has been described above, according to the bicycle simulation system 10 in the present embodiment, the flywheel 74 is frictionally braked based on the operation on the brake lever 100R, whereby the brake lever 100R can be operated with the same feeling as that in the case of a real bicycle. In addition, as above-mentioned, the brake lever 100R is connected to the brake wires 104a and 104b branched in a bifurcate form, the brake wire 104b on one side is connected to the drum brake 110, and the brake wire 104a on the other side is connected to the rotational sensor 108L. This makes it possible to provide the rotational sensor 108L and the drum brake 110 separately and independently. Further, for the drum brake 110, the general-purpose brake mechanism of a real bicycle which is wire operated can be adopted as it is. Therefore, the feeling of operating the brake lever 100R can be set close to that on a real bicycle, and the brake lever 100R is configured inexpensively. Further, an appearance close to that in a real bicycle can be obtained, the rider can feel like he/she is riding a real bicycle, and the feeling of security in operation is enhanced more. The flywheel 74 as a rotary body is simple in structure, and permits a high degree of freedom in designing.

Furthermore, the rider's operation can be judged based on the operational amount of the brake lever 100R which is supplied from the rotational sensor 108L, and, based on the judgment, an alarm or a guidance can be outputted and a variety of simulations can be achieved.

In addition, while an example in which the drum brake 100 is put into braking only by the brake wire 104a has been described, a configuration may be adopted in which, as shown in FIG. 8, another brake wire 200 is connected to the arm 110a together with the brake wire 104b, and the flywheel 74 is braked when at least one of the two brake wires is pulled. In this case, the brake wire 200 is made to be one of the wires branched by a mechanism similar to a branching mechanism 111 (see FIG. 9) from the brake wire 104 connected to the right brake lever 100R, whereby the left brake lever 100L can also be used for the braking action. In other words, one drum brake 110 can be operated in a combined manner by the brake lever 100R and the brake lever 100L, and braking can be conducted by operating either one or both of the two brake levers.

In addition, a configuration may be adopted in which the brake wires 102 and 104 connected to the left and right brake levers 100L and 100R are respectively branched, and the brake wires 104b and 200 on one side of the branched brake wires are connected to two caliper brakes 202 and 204 shown in FIG. 9. The caliper brakes 202 and 204 are brakes which are provided independently. Thus, when the brake wires 104b and 200 are pulled, the two arms are closed, and brake shoes provided at the tip ends of the arms are brought into frictional contact with a rim 74b of the flywheel 74, thereby causing a braking action.

Figure 11:
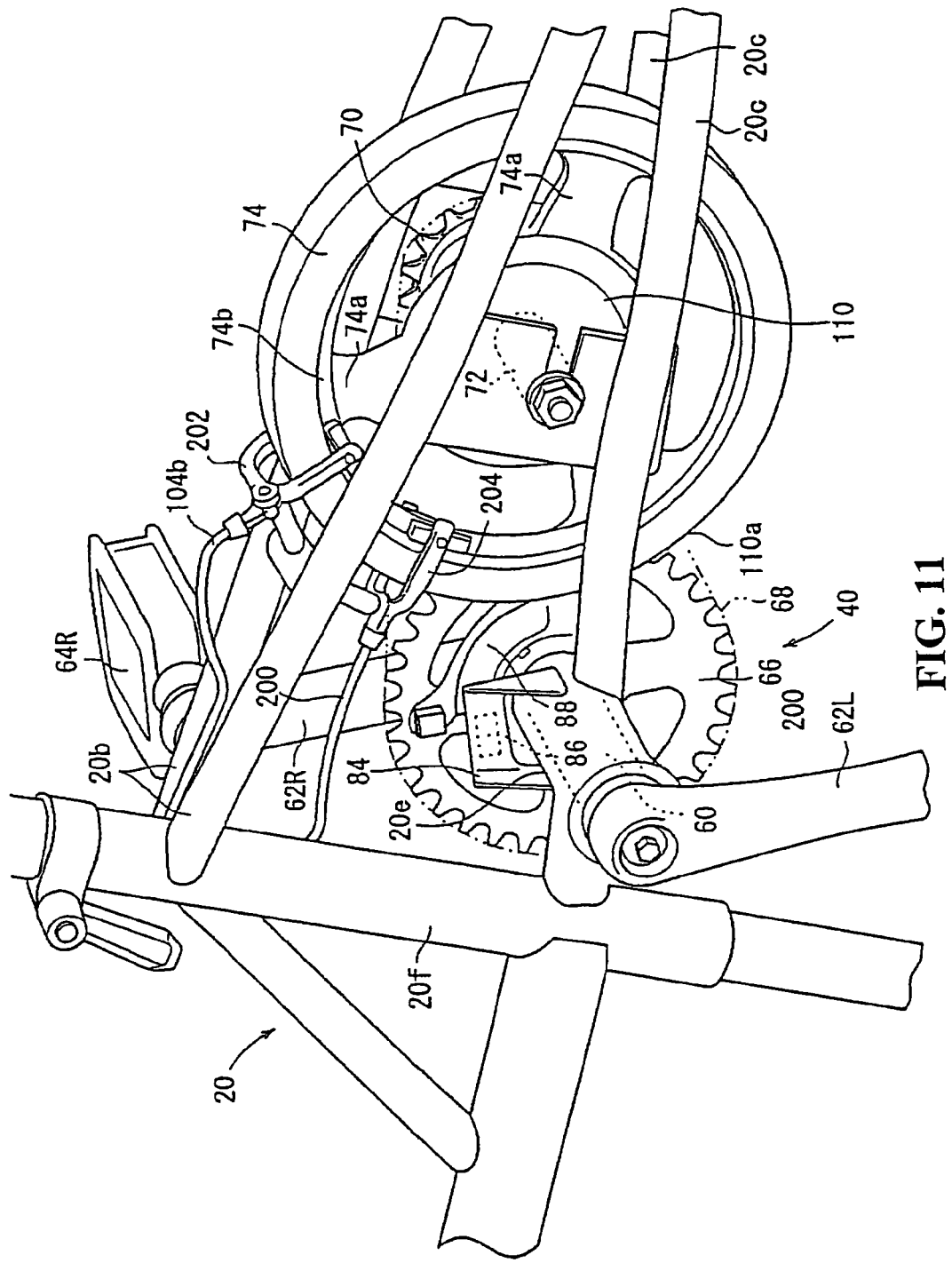
FIG. 11 shows a flywheel provided with two caliper brakes for braking.

As illustrated in FIG. 11, with the left and right brake levers 100L and 100R thus made to act for braking of the flywheel 74, the operation is made close to that on a real bicycle, which is preferable.

Figure 12:
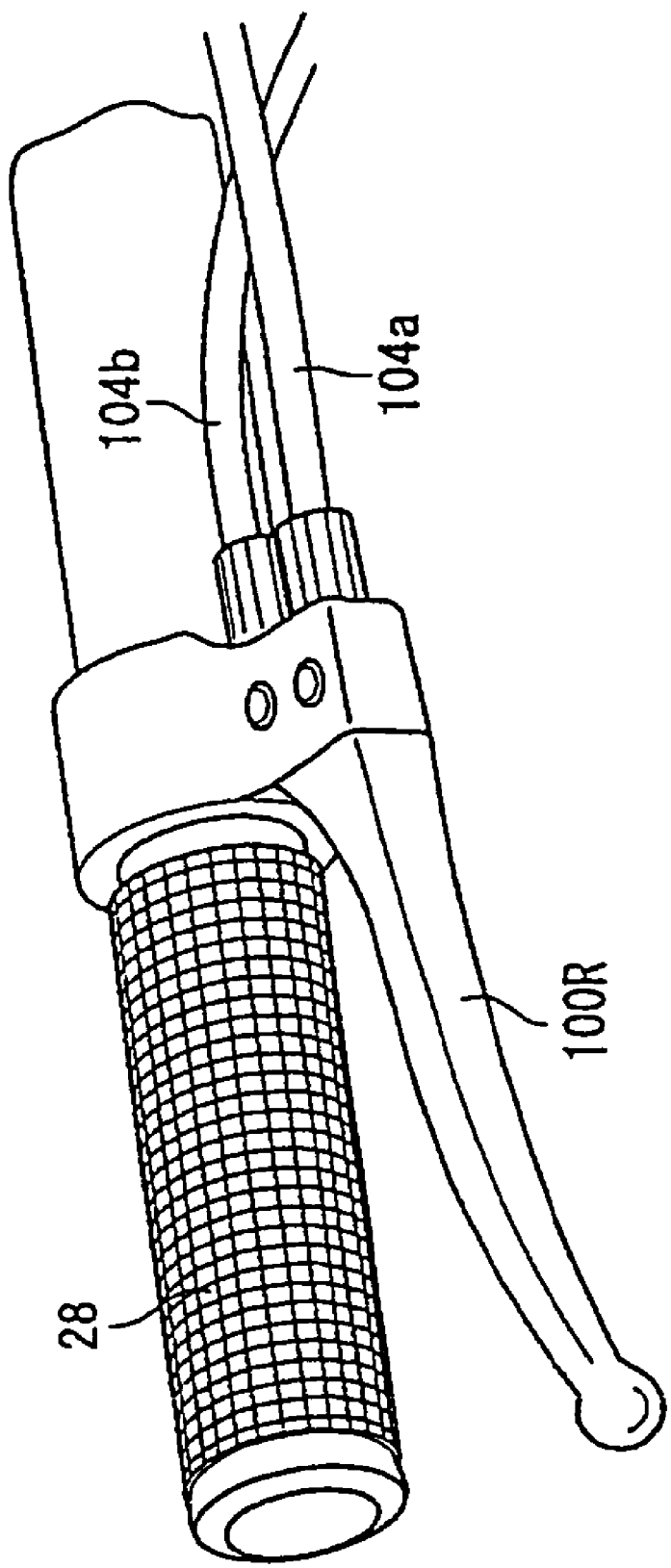
FIG. 12 shows a brake lever with two brake wires connected thereto.

Furthermore, the means for making the rotational sensor 108L and the arm 110a act by the brake lever 100R is not limited to the branching mechanism 111. For example, a configuration may be adopted in which, as shown in FIG. 12, two brake wires 104a and 104b can be pulled directly by the brake lever 100R. In this case, the brake wire 104b is made to generate a stronger force, and may be used for the braking action of the drum brake 110. The other rotational sensor 108L can be operated with a smaller force.

The bicycle simulation system according to the present invention is not limited to the above-described embodiment, and various configurations can naturally be adopted without departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle simulation system including a dummy bicycle comprising:
   a frame;
   a left-right pair of pedals disposed on the frame to be operated by a rider;
   a rotary body rotated in conjunction with the working of said pedals;
   a stand supporting a part of said frame relative to a ground surface; and
   a wheel being not used in conjunction with said rotary body and said pedals and being rotatable relative to said frame;
   said wheel being adapted to be in contact with said ground surface and supporting said frame together with said stand, wherein a position of a rotational axis of said rotary body in a front-rear direction of the dummy bicycle is located between a rotational axis of said pedals and said wheel, wherein the frame includes left and right chain stays extending rearwardly from a crank tube of the frame toward a rear of the dummy bicycle, wherein the wheel is mounted on rear ends of the left and right chain stays, and the rotary body and the wheel being disposed between the left and right chain stays.

2. The bicycle simulation system as set forth in claim 1, wherein
said stand supports a front side of said frame, and
said wheel supports a rear side of said frame.

3. The bicycle simulation system as set forth in claim 1, wherein a rotational axis of said rotary body is provided on an upper side relative to a rotational axis of said wheel.

4. A bicycle simulation system including a dummy bicycle comprising:
a frame;
a left-right pair of pedals disposed on the frame to be operated by a rider;
a body operatively connected to said left-right pair of pedals for rotation;
a stand operatively connected to said frame for supporting said frame relative to a ground surface; and
a wheel being displaced along said frame relative to said body and being rotatable relative to said frame;
said wheel being in contact with said ground surface and supporting said frame together with said stand,
wherein the frame includes left and right chain stays extending rearwardly from a crank tube of the frame toward a rear of the dummy vehicle,
wherein the wheel is mounted between rear ends of the left and right stays, and
the rotary body being disposed in a lateral direction of the dummy vehicle between the left and right chain stays, and in a longitudinal direction of the dummy vehicle between the crank tube and the wheel.

5. The bicycle simulation system as set forth in claim 4, wherein
said stand supports a front side of said frame, and
said wheel is a single wheel which supports a rear side of said frame.

6. The bicycle simulation system as set forth in claim 4, wherein a position of a rotational axis of said body in a front-rear direction of the dummy vehicle is located between the rotational axis of said pedals and the rotational axis of said wheel which is in contact with said ground surface.

7. The bicycle simulation system as set forth in claim 5, wherein a position of a rotational axis of said body in a front-rear direction of the dummy vehicle is located between a rotational axis of said pedals and the rotational axis of said wheel which is in contact with said ground surface.

8. A bicycle simulation system including a dummy bicycle and a controller, wherein said dummy bicycle comprises:
a left-right pair of pedals disposed on the dummy bicycle to be operated by a rider;
a rotary body rotated in conjunction with operation of said pedals;
a brake lever manually operated by the rider;
a brake for frictionally braking the rotation of said rotary body in conjunction with said brake lever; and
a brake operational detection means for detecting the amount of operation on said brake lever;
said controller performing a predetermined output based on the amount of operation supplied from said brake operational detection means,
wherein said brake lever is connected to brake wires branched in a bifurcate form, a first brake wire on one side is connected to said brake, and a second brake wire on the other side is connected to said brake operational detection means.

9. The bicycle simulation system as set forth in claim 8, wherein said controller is disposed in a position that is forward of the pedals, and a flywheel is disposed in a position that is rearward of the pedals and forward of a portion of the dummy bicycle which makes contact with a support surface.

10. The bicycle simulation system as set forth in claim 8, wherein said controller outputs an alarm based on the amount of operation supplied from said brake operation detection means during a simulated cycling.

11. The bicycle simulation system as set forth in claim 9, wherein said controller outputs an alarm based on the amount of operation supplied from said brake operation detection means during a simulated cycling.

12. The bicycle simulation system as set forth in claim 8, wherein said brake lever includes a first brake lever and a second brake lever, said first brake lever and said second brake lever are connected respectively with proximal ends of said brake wires, and the distal ends of said brake wires are connected to said brake.

13. The bicycle simulation system as set forth in claim 8, wherein left-right pair of pedals are disposed between front and rear portions of the dummy bicycle which are in contact with a support surface, and
the rotary body rotated by the pedals is a flywheel, and
when the dummy bicycle is viewed from a side view said flywheel is seen to overlap a sprocket on a crankshaft to which the pedals are attached.

14. The bicycle simulation system as set forth in claim 4, wherein the body rotated by the pedals is a flywheel, and
when the dummy bicycle is viewed from a side view said flywheel is seen to overlap a sprocket on a crankshaft to which the pedals are attached.

15. The bicycle simulation system as set forth in claim 8, wherein said rotary body is a flywheel for simulating the effect of operating a bicycle.

16. The bicycle simulation system as set forth in claim 8, and further including a display for illustrating the simulated operation of a bicycle based on output from the controller.

17. The bicycle simulation system as set forth in claim 9, and further including a display for illustrating the simulated operation of a bicycle based on output from the controller.

* * * * *